United States Patent [19]

Chu et al.

[11] Patent Number: 5,231,131
[45] Date of Patent: Jul. 27, 1993

[54] AQUEOUS GRAFT COPOLYMER PIGMENT DISPERSANTS

[75] Inventors: I. Cheng Chu, Broomall, Pa.; Michael Fryd, Moorestown, N.J.; Laurie E. Lynch, Lansdowne, Pa.

[73] Assignee: E. I. Du Pont de Nemours and Company, Wilmington, Del.

[21] Appl. No.: 813,186

[22] Filed: Dec. 24, 1991

[51] Int. Cl.$^5$ ............. C08L 51/06; C08L 33/12; C08L 33/08; C08L 33/10
[52] U.S. Cl. ................. 524/504; 524/529; 524/533; 524/535
[58] Field of Search ............ 524/504, 529, 533, 535

[56] References Cited

U.S. PATENT DOCUMENTS

| | | | |
|---|---|---|---|
| 3,729,439 | 4/1973 | Parker | 260/29.7 W |
| 3,801,524 | 4/1974 | Parker | 260/29.6 WB |
| 3,862,077 | 1/1975 | Schulz et al. | 260/29.6 RB |
| 3,862,097 | 1/1975 | Milkovitch et al. | 260/93.5 A |
| 3,928,255 | 12/1975 | Milkovitch et al. | 260/2.5 R |
| 3,948,866 | 4/1976 | Pennewiss et al. | 260/79.3 |
| 4,085,168 | 4/1978 | Milkovitch et al. | 260/886 |
| 4,178,318 | 12/1979 | Cheung | 525/77 |
| 4,234,466 | 11/1980 | Takahashi et al. | 524/529 |
| 4,273,888 | 6/1981 | Graetz | 525/31 |
| 4,279,795 | 7/1981 | Yamashita et al. | 524/533 |
| 4,330,441 | 5/1982 | Böhmer et al. | 525/54.23 |
| 4,355,122 | 10/1982 | Fan | 523/423 |
| 4,564,648 | 1/1986 | Huybrechts et al. | 523/423 |
| 4,672,089 | 6/1987 | Pricone et al. | 524/354 |
| 4,908,468 | 3/1990 | Muramoto et al. | 560/14 |
| 4,910,268 | 3/1990 | Kobayashi | 525/411 |
| 4,916,191 | 4/1990 | Takeuchi et al. | 525/276 |
| 4,927,875 | 5/1990 | Maska et al. | 524/457 |
| 4,988,771 | 1/1991 | Takeuchi et al. | 525/276 |

FOREIGN PATENT DOCUMENTS

| | | |
|---|---|---|
| 0007731 | 7/1980 | European Pat. Off. |
| 0137230 | 11/1978 | Japan ............... 524/533 |
| 1-182304 | 7/1989 | Japan . |

Primary Examiner—Paul R. Michl
Assistant Examiner—Peter Szekely
Attorney, Agent, or Firm—Hilmar L. Fricke

[57] ABSTRACT

A pigment dispersion useful for forming coating compositions containing dispersed pigment, an aqueous carrier and a graft copolymer dispersant; wherein the graft copolymer has a weight average molecular weight of about 5,000–100,000 and has a polymeric backbone and macromonomer side chains attached to the backbone wherein (1) the polymeric backbone is hydrophobic in comparison to the side chains and contains polymerized ethylenically unsaturated hydrophobic monomers and up to 20% by weight, based on the weight of the graft copolymer, of polymerized ethylenically unsaturated acid containing monomers; and (2) the sidechains are hydrophilic macromonomers attached to the backbone at a single terminal point and contain polymerized ethylenically unsaturated monomers and 2–100% by weight, based on the weight of the graft copolymer, of polymerized ethylenically unsaturated acid containing monomers and have a weight average molecular weight of about 1,000–30,000 and wherein the acid groups of the graft copolymer are neutralized with an inorganic base or an amine.

The graft copolymer and a process for making the graft copolymer also are disclosed.

18 Claims, No Drawings

AQUEOUS GRAFT COPOLYMER PIGMENT DISPERSANTS

BACKGROUND OF THE INVENTION

This invention is directed to pigment dispersions and in particular to pigment dispersions formulated with a graft copolymer having acid functionality.

Water dispersible polymers are well known in the art and have been used to form waterbased coating compositions, pigment dispersions, adhesives and the like. Graft copolymers containing carboxyl groups and the preparation of these polymers is shown in Japanese Laid Open Patent Application (Kokai) No. 1-182304 dated Jul. 20, 1989. This reference shows graft copolymers that have carboxyl groups based on acrylic and methacrylic acid in their side chains that have hydrophilic properties and teaches the use tertiary alcohol-based ester units of acrylic or methacrylic acid to form a macromonomer which is used to form a graft copolymer and then is hydrolyzed to form carboxylic acid groups on the polymer. The process taught by the reference is an inefficient process which does not form pure graft copolymer but results in a mixture of graft copolymer and low molecular weight components that are detrimental to pigment dispersions formed from the graft copolymer and finishes from such a composition.

Typical problems with water based coating compositions are as follows: the pigment dispersion used to form the composition often is not completely compatible with the film forming binder constituents of the composition; the polymeric dispersant does not uniformly disperse the pigments and the pigments flocculate or agglomerate; or the dispersant does not enter into the curing reaction and remains in the film as an unwanted component which later may leach out or cause deterioration of the resulting finish.

A polymeric dispersant is needed that will form an aqueous pigment dispersion that is stable and not flocculated or agglomerated, that is compatible with a variety of polymeric film forming binders conventionally used in water based coating compositions and that will cure with the film to form a finish of automotive quality that does not deteriorate on weathering because of adverse properties caused by the presence of the polymeric dispersant.

SUMMARY OF THE INVENTION

A pigment dispersion useful for forming coating compositions containing dispersed pigment, an aqueous carrier and a graft copolymer dispersant; wherein the graft copolymer has a weight average molecular weight of about 5,000-100,000 and comprises a polymeric backbone and macromonomer side chains attached to the backbone wherein (1) the polymeric backbone is hydrophobic in comparison to the side chains and contains polymerized ethylenically unsaturated hydrophobic monomers and up to 20% by weight, based on the weight of the graft copolymer, of polymerized ethylenically unsaturated acid containing monomers; and (2) the sidechains are hydrophilic macromonomers that are attached to the backbone at a single terminal point and contain polymerized ethylenically unsaturated monomers and 2-100% by weight, based on the weight of the macromonomer, of polymerized ethylenically unsaturated acid containing monomers and have a weight average molecular weight of about 1,000-30,000 and wherein the acid groups of the graft copolymer are neutralized with an inorganic base or an amine.

The graft copolymer and the process for making the graft copolymer are also part of this invention.

DETAILED DESCRIPTION OF THE INVENTION

The novel pigment dispersion is stable and in general is nonflocculated or agglomerated and is compatible with a variety of polymeric film forming binders that are conventionally used in waterborne coating compositions and in particular is compatible with acrylic polymers that are widely used in waterborne coatings. The graft copolymer dispersant upon curing of the coating, generally reacts with other film forming components of the coating composition and becomes part of the film and does not cause deterioration of the film upon weathering as may occur if it was an unreacted component of the film. Also, the freeze-thaw stability of the pigment dispersion is improved. Because the graft copolymer is an excellent pigment dispersant, the ratio of copolymer to pigment is less than is used with conventional dispersants particularly with metal oxide pigments such as iron oxide, titanium dioxide, zinc oxide and the like. The use of less dispersant reduces water sensitivity of the resulting finish.

The novel graft copolymer prepared by the process set forth herein is efficiently prepared and 100% graft copolymer is formed and not a mixture of graft copolymer and low molecular weight backbone polymer and copolymerized macromonomer segments as has generally been the case with prior art process used for making graft copolymers.

The graft copolymer contains about 50-90% by weight of polymeric backbone and correspondingly about 10-50% by weight of sidechains. The graft copolymer has a weight average molecular weight of about 5,000-100,000 and preferably about 10,000-40,000. The side chains of the graft copolymer are formed from hydrophilic macromonomers that have a weight average molecular weight of about 1,000-30,000 and preferably 2,000-5,000 and contain about 2-100% by weight and preferably 20-50% by weight, based on the weight of the macromonomer, of polymerized ethylenically unsaturated acid monomers. These sidechains are hydrophilic and keep the dispersant and pigments uniformly dispersed in the pigment dispersion and in the resulting coating composition.

The backbone of the graft copolymer is hydrophobic relative to the sidechains and may contain up to 20% by weight, preferably 1-10% by weight, based on the weight of the graft copolymer, of polymerized ethylenically unsaturated acid monomers which are listed hereinafter. The backbone contains polymerized hydrophobic monomers such as alkyl methacrylates and acrylates, cycloaliphatic methacrylates and acrylates and aryl methacrylates and acrylates as are listed hereinafter and also may contain up to 30% by weight, based on the weight of the graft copolymer, of polymerized ethylenically unsaturated non-hydrophobic monomers which may contain functional groups. Examples of such monomers are hydroxy ethyl acrylate, hydroxy ethyl methacrylate, t-butylamino ethyl methacrylate, diethyl amino ethyl acrylate, diethyl amino ethyl methacrylate, acrylamide, nitro phenol acrylate, nitro phenol methacrylate, phthalimido methyl acrylate, phthalimido methacrylate, acrylic acid, acryloamido propane sulfonic acid.

The backbone of the graft copolymer has an affinity for the surface of the pigment used in the dispersion and anchors the copolymer to the pigment and keeps the pigment dispersed and prevents the graft copolymer from returning to the aqueous phase. Reactive groups on the backbone can react with the pigment and form a bond with the pigment.

Molecular weights are determined by Gel Permeation Chromatography using polystyrene as a standard.

The macromonomer contains a single terminal ethylenically unsaturated group which is polymerized into the backbone of the graft copolymer and primarily contains polymerized monomers of methacrylic acid, its esters, nitriles, amides or mixtures of these monomers.

Typical alkyl methacrylates that can be used have 1-8 carbon atoms in the alkyl group and are for example methyl methacrylate, ethyl methacrylate, propyl methacrylate, isopropyl methacrylate, butyl methacrylate, pentyl methacrylate, hexyl methacrylate, 2-ethyl hexyl methacrylate and the like. Cycloaliphatic methacrylates also can be used such as trimethylcyclohexyl methacrylate, isobutylcyclohexyl methacrylate, and the like. Aryl methacrylates also can be used such as benzyl methacrylate. Other polymerizable monomers that can be used are styrene, alpha methyl styrene, methacrylamide and methacrylonitrile. The above monomers can also be used in the backbone of the graft copolymer.

The macromonomer can contain 2-100% by weight, preferably about 20-50% by weight, based on the weight of the macromonomer, of polymerized ethylenically unsaturated acid. Methacrylic acid is preferred particularly if it is the sole constituent. Other acids that can be used are ethylenically unsaturated carboxylic acids such as acrylic acid, itaconic acid, maleic acid and the like. Ethylenically unsaturated sulfonic, sulfinic, phosphoric or phosphonic acid and esters thereof also can be used such as styrene sulfonic acid, acrylamido methyl propane sulfonic acid, vinyl phosphonic acid and its esters and the like. The above acids also can be used in the backbone of the graft copolymer.

Up to 40% by weight, based on the weight of the macromonomer, of other polymerized ethylenically unsaturated monomers can be present in the macromonomer. Primarily alkyl acrylates having 1-12 carbons in the alkyl group can be used such as methyl acrylate, ethyl acrylate, propyl acrylate, isopropyl acrylate, butyl acrylate, pentyl acrylate, hexyl acrylate, 2-ethyl acrylate, nonyl acrylate, lauryl acrylate and the like can be used. Cycloaliphatic acrylates can be used such as trimethylcyclohexyl acrylate, t-butyl cyclohexyl acrylate and the like. Aryl acrylates such as benzyl acrylate also can be used. The above monomers also can be used in the backbone of the graft copolymer.

One preferred macromonomer contains about 50-80% by weight of polymerized methyl methacrylate and 20-50% by weight of polymerized methacrylic acid and has a weight average molecular weight of about 2,000-5,000.

To ensure that the resulting macromonomer only has one terminal ethylenically unsaturated group which will polymerize with the backbone monomers to form the graft copolymer, the macromonomer is polymerized by using a catalytic chain transfer agent that contains a $Co^{+2}$ group, i.e. a cobalt chain transfer agent. Typically, in the first step of the process for preparing the macromonomer, the monomers are blended with an inert organic solvent which is water miscible or water dispersible and a cobalt chain transfer agent and heated usually to the reflux temperature of the reaction mixture. In subsequent steps additional monomers and cobalt catalyst and conventional azo type polymerization catalyst such as 2,2'-azobis(2-methylbutanenitrile) and 2,2'-azobis(2,4'-dimethylpentanenitrile) 2,2'-azobis(2,4-dimethyl-4-methoxyvaleronitrile) are added and polymerization is continued until a macromonomer is formed of the desired molecular weight.

Preferred cobalt chain transfer agents or catalysts are described in U.S. Pat. No. 4,680,352 to Janowicz et al and U.S. Pat. No. 4,722,984 to Janowicz. Most preferred are pentacyanocobaltate (II), diaquabis(borondifluorodimethyl-glyoximato) cobaltate(II) and diaquabis(borondifluorophenylglyoximato) cobaltate (II). Typically these chain transfer agents used at concentrations of about 5-1000 ppm based on the monomers used.

After the macromonomer is formed as described above, optionally solvent is stripped off and the backbone monomers are added to the macromonomer along with additional solvent and polymerization catalyst. Any of the aforementioned azo type catalyst can be used as can other suitable catalyst such as peroxides and hydroperoxides. Typical of such catalyst are di-tertiarybutyl peroxide, di-cumylperoxide, tertiaryamyl peroxide, cumenehydroperoxide, di(n-propyl) peroxydicarbonate, peresters such as amyl peroxyacetate and the like. Polymerization is continued usually at the reflux temperature of the reaction mixture until a graft copolymer is formed of the desired molecular weight.

Typical solvents that can be used to form the macromonomer or the graft copolymer are ketones such as methyl ethyl ketone, isobutyl ketone, ethyl amyl ketone, acetone, alcohols such as methanol, ethanol, isopropanol, esters such as ethyl acetate, glycols such as ethylene glycol, propylene glycol, ethers such as tetrahydrofuran, ethylene glycol mono butyl ether and the like.

After the graft copolymer is formed, it is neutralized with an amine or an inorganic base such as ammonium hydroxide or sodium hydroxide and then water is added to form a dispersion. Typical amines that can be used include amino methyl propanol, amino ethyl propanol, dimethyl ethanol amine, triethylamine and the like. One preferred amine is amino methyl propanol and the preferred inorganic base is ammonium hydroxide.

Particularly useful graft copolymers include the following:

a graft copolymer having a backbone of polymerized methyl acrylate and butyl acrylate and side chains of a macromonomer having a weight average molecular weight of about 2,000-5,000 and containing about 50-80% by weight, based on the weight of the macromonomer, of polymerized methyl methacrylate and 20-50% by weight, based on the weight of the macromonomer, of polymerized methacrylic acid.

a graft copolymer having a backbone of polymerized methyl acrylate and butyl acrylate and acrylamido methyl propane sulfonic acid and side chains of the above macromonomer.

a graft copolymer having a backbone of polymerized methyl acrylate and butyl acrylate and acrylic acid and side chains of the above macromonomer.

a graft copolymer having a backbone of polymerized ethyl acrylate and side chains of the above macromonomer.

a graft copolymer having a backbone of polymerized ethyl acrylate and acrylic acid and side chains of the above macromonomer.

a graft copolymer having a backbone of polymerized ethyl acrylate, methyl acrylate and acrylic acid and side chains of the above macromonomer.

To form a pigment dispersion or a mill base, pigments are added to the aqueous graft copolymer dispersion and then the pigments are dispersed using conventional techniques such as high speed mixing, ball milling, sand grinding, attritor grinding or two or three roll milling. The resulting pigment dispersion has a pigment to dispersant binder weight ratio of about 0.1/100 to 1500/100.

Any of the conventional pigments used in paints in particular waterborne paints can be used to form the pigment dispersion such as metallic oxides like titanium dioxide, iron oxides of various colors, zinc oxide, carbon black, filler pigments such as talc, china clay, barytes, carbonates, silicates and a wide variety of organic pigments such as quinacridones, phthalocyanines, perylenes, azo pigments, indanthrones, carbazoles such as carbozole violet, isoindolinones, isoindolones, thioindigio reds, benzimidazolinones, metallic flakes such aluminum flake pearlescent flakes and the like.

It may be desirable to add other optional ingredients to the pigment dispersion such as antioxidants, flow control agents, rheology control agents such as fumed silica, microgels, UV stabilizers, screeners, quenchers and absorbers.

Pigment dispersions of this invention can be added to a variety of waterborne coating compositions such as primers, primer surfacers, topcoats which may be monocoats or basecoats of a clear coat base coat finish. These compositions preferably have an acrylic polymer as the film forming constituent and may contain crosslinking agents such as blocked isocyanates, alkylated melamines, epoxy resins and the like. Other film forming polymers can also be used such as acrylourethanes, polyesters and polyester urethanes, polyethers and polyether urethanes that are compatible with the pigment dispersion. It is desirable to have the film forming polymer of the coating composition be similar to the polymer of the pigment dispersion so that on curing the polymer of the pigment dispersion will cure with the coating polymer and become part of the film or coating.

The following examples illustrate the invention. All parts and percentages are on a weight basis unless otherwise indicated. Molecular weights are determined by Gel Permeation Chromatography using polystyrene as the standard and tetrahydrofuran as the carrier solvent.

EXAMPLE 1

A macromonomer was prepared by charging the following constituents into a 3 liter flask equipped with a thermometer, stirrer dropping funnels, reflux condenser and a means for maintaining a nitrogen blanket over the reactants:

| | Parts by Weight |
| --- | --- |
| Portion 1 | |
| Methyl methacrylate monomer | 91.50 |
| Methacrylic acid monomer | 91.50 |
| Methyl ethyl ketone | 180.50 |
| Portion 2 | |
| Diaquabis(borondifluorodiphenyl-glyoximato) cobalt(II), Co(DPG-BF$_2$) | 0.07 |
| 2,2'-azobis(2-methylbutanenitrile) | 0.50 |

| -continued | |
| --- | --- |
| | Parts by Weight |
| Methyl ethyl ketone | 20.00 |
| Portion 3 | |
| Methyl methacrylate monomer | 251.80 |
| Methacrylic acid monomer | 205.90 |
| Portion 4 | |
| Co(DPG-BF$_2$) | 0.07 |
| 2,2'azobis(2-methylbutanenitrile) | 3.00 |
| Methyl ethyl ketone | 45.00 |
| Portion 5 | |
| 2,2'azobis(2,4-dimethylpentanenitrile) | 1.50 |
| Co(DPG-BF$_2$) | 0.03 |
| Methyl ethyl ketone | 75.00 |
| Portion 6 | |
| 2,2'azobis(2,4-dimethylpentanenitrile) | 1.50 |
| Co(DPG-BF$_2$) | 0.04 |
| Methyl ethyl ketone | 75.00 |
| Total | 1042.90 |

The composition was heated to its reflux temperature in about 20 minutes. Portion 2 was added and the composition was held at its reflux temperature for 5 minutes. Portion 3 and 4 were added simultaneously while the reaction mixture was held at its reflux temperature. The addition of Portion 3 took 4 hours to complete and the addition of Portion 4 took 90 minutes to complete. When the addition of Portion 4 was completed, the gradual addition of Portion 5 was begun and took about 75 minutes while the reaction mixture was held at its reflux temperature. Portion 6 was added over a 75 minute period while maintaining the reaction mixture at its reflux temperature. Reflux was continued for an addition 15 minutes and the composition was cooled to room temperature.

The resulting macromonomer solution has a solids content of about 53%, contained 60% methyl methacrylate and 40% methacrylic acid and had a weight average molecular weight of about 2,558 and a number average molecular weight of about 1,482.

Solvent was stripped off in a vacuum oven to give 100% solids macromonomer which is used below to form the graft copolymer.

The following constituents were charged into a two liter flask equipped as above to form a graft copolymer solution:

| | Parts by Weight |
| --- | --- |
| Portion 1 | |
| Macromonomer (prepared above) | 169.6 |
| Butyl acrylate monomer | 12.9 |
| Methyl acrylate monomer | 12.9 |
| Isopropanol | 340.0 |
| Portion 2 | |
| 2,2'-azobis(2-methylbutanenitrile) | 6.0 |
| Isopropanol | 60.0 |
| Portion 3 | |
| Butyl acrylate monomer | 202.5 |
| Methyl acrylate monomer | 202.5 |
| Portion 4 | |
| 2,2'-azobis(2,4-dimethylpentanenitrile) | 2.0 |
| Isopropanol | 180.0 |
| Total | 1184.4 |

Portion 1 was heated to its reflux temperature over a period of about 20 minutes. Portion 2 was added and simultaneously Portions 3 and 4 were gradually added over about a 3 hour period while maintaining the resulting reaction mixture at its reflux temperature. The reaction mixture was held at its reflux temperature for about an additional 2 hours and then cooled to room temperature.

The resulting graft polymer solution had a solids content of about 49% by weight and had the following overall approximate composition 36% butyl acrylate, 36% methyl acrylate, 17% methyl methacrylate and 11% methacrylic acid and had a weight average molecular weight of about 13,000 and a number average molecular weight of about 4,000.

A neutralized graft copolymer solution was prepared. About 37.4 parts by weight of 2-amino-2-methyl-1-propanol in 200.0 parts by weight of isopropanol was added to about 600 parts by weight of the above graft copolymer solution over about 20 minutes with stirring at room temperature and stirring was continues for about 30 minutes.

A waterborne pigment dispersion was prepared by charging the following constituents into a 01 Attritor media mill:

|  | Parts by Weight |
|---|---|
| Neutralized graft copolymer solution (prepared above) | 44.84 |
| Deionized water | 314.44 |
| Quinacridone magenta pigment (Hostaperm Pink E 13-7000 from Hoechst Celanese Corp) | 15.72 |
| Hi-density ceramic 1.6-2.5 mm grinding media (ER120A from Netsch) | 850.00 |
| Total | 1225.00 |

The above constituents were ground for 20 hours at 500 rpm. A uniform, transparent, waterborne pigment dispersion was formed that was stable and deflocculated and had a pH of 7.9.

Another neutralized graft copolymer solution was prepared. About 500 parts by weight of the above graft copolymer solution was added to 23 parts by weight of ammonium hydroxide over about 20 minutes with stirring at room temperature and stirring was continued for about 30 minutes.

A waterborne pigment dispersion was prepared by charging the following constituents into a 01 Attritor media mill:

|  | Parts by Weight |
|---|---|
| Neutralized graft copolymer solution (prepared above neutralized with ammonium hydroxide) | 122.92 |
| Isopropanol | 10.40 |
| Non-ionic surfactant (octyl phenol polyether alcohol) | 6.40 |
| Deionized water | 196.28 |
| Blue pigment (Palomar blue pigment EB-8592 from Mobay) | 64.00 |
| Hi-density ceramic 1.6-2.5 mm grinding media (ER120A from Netsch) | 850.00 |
| Total | 1250.00 |

The above constituents were ground for 22 hours at 500 rpm. A uniform, waterborne pigment dispersion was formed that was stable and deflocculated and had a pH of 9.14.

EXAMPLE 2

The following constituents were charged into a one liter flask equipped as in Example 1 to form a graft copolymer solution:

|  | Parts by Weight |
|---|---|
| Portion 1 | |
| Macromonomer (prepared in Example 1) | 60.0 |
| Butyl acrylate monomer | 19.2 |
| Methyl acrylate monomer | 19.2 |
| Acrylic acid monomer | 1.6 |
| Isopropanol | 190.0 |
| Portion 2 | |
| 2,2'-azobis(2-methylbutanenitrile) | 1.0 |
| Isopropanol | 10.0 |
| Portion 3 | |
| Acrylic acid monomer | 14.3 |
| Butyl acrylate monomer | 76.6 |
| Methyl acrylate monomer | 76.6 |
| Macromonomer (prepared in Example 1) | 32.5 |
| Isopropanol | 35.0 |
| Portion 4 | |
| 2,2'-azobis(2,4-dimethylpentanenitrile) | 2.5 |
| Isopropanol | 50.0 |
| Portion 5 | |
| 2,2'-azobis(2,4-dimethylpentanenitrile) | 1.0 |
| Isopropanol | 10.0 |
| Total | 599.5 |

Portion 1 was heated to its reflux temperature over a period of about 20 minutes. Portion 2 was added and simultaneously Portions 3 and 4 were gradually added over about a 3 hour period while maintaining the resulting reaction mixture at its reflux temperature. The reaction mixture was held at its reflux temperature for about an additional 2 hours. Portion 5 was added and the reaction mixture was held at its reflux temperature for an addition 2 hours and then cooled to room temperature.

The resulting graft polymer solution had a solids content of about 48% by weight and the graft copolymer had the following overall approximate composition 32% butyl acrylate, 32% methyl acrylate, 12% methacrylic acid, 18% methyl methacrylate and 5% acrylic acid and had a weight average molecular weight of about 15,000 and a number average molecular weight of about 4,000.

A neutralized graft copolymer solution was prepared. About 39 parts by weight of 2-amino-2-methyl-1-propanol was added to about 380 parts by weight of the above graft copolymer solution over about 20 minutes with stirring at room temperature and stirring was continues for about 30 minutes.

A waterborne pigment dispersion was prepared by charging the following constituents into a 01 Attritor media mill:

|  | Parts by Weight |
|---|---|
| Neutralized graft copolymer solution (prepared above) | 7.98 |
| Deionized water | 307.02 |
| Transparent iron oxide pigment (Trans-oxide red 30-1005 from Hilton Davis) | 35.00 |
| Hi-density ceramic 1.6-2.5 mm grinding media (ER120A from Netsch) | 850.00 |
| Total | 1200.00 |

The above constituents were ground for 22 hours at 500 rpm. A uniform, transparent, waterborne pigment dispersion was formed that was stable and deflocculated and had a pH of 8.5.

EXAMPLE 3

The following constituents were charged into a one liter flask equipped as in Example 1 to form a graft copolymer solution:

|  | Parts by Weight |
|---|---|
| Portion 1 | |
| Macromonomer (prepared in Example 1) | 92.5 |
| Butyl acrylate monomer | 9.6 |
| Methyl acrylate monomer | 9.6 |
| Isopropanol | 190.0 |
| 2-acrylamido-2-methyl-1-propane sulfonic acid | 3.2 |
| Deionized water | 3.0 |
| Portion 2 | |
| 2,2'-azobis(2,4-dimethylpentanenitrile) | 1.2 |
| Isopropanol | 10.0 |
| Portion 3 | |
| Butyl acrylate monomer | 86.2 |
| Methyl acrylate monomer | 86.2 |
| Portion 4 | |
| 2,2'-azobis(2,4-dimethylpentanenitrile) | 3.0 |
| Isopropanol | 30.0 |
| Portion 5 | |
| 2-acrylamido-2-methyl-1-propanesulfonic acid | 12.7 |
| Deionized water | 12.0 |
| Portion 6 | |
| 2,2'-azobis(2,4-dimethylpentanenitrile) | 1.0 |
| Isopropanol | 10.0 |
| Total | 560.2 |

Portion 1 was heated to its reflux temperature over a period of about 20 minutes. Portion 2 was added and simultaneously Portions 3, 4 and 5 were gradually added over about a 3 hour period while maintaining the resulting reaction mixture at its reflux temperature. The reaction mixture was held at its reflux temperature for about an additional 2 hours. Portion 6 was added and the reaction mixture was held at its reflux temperature for an addition 2 hours and then cooled to room temperature.

The resulting graft polymer solution had a solids content of about 53% by weight and the graft copolymer had the following overall approximate composition 32% butyl acrylate, 32% methyl acrylate, 12% methacrylic acid, 18% methyl methacrylate and 5% 2-acrylamido-2-methyl-1-propane sulfonic acid and had a weight average molecular weight of about 14,000 and a number average molecular weight of about 4,600.

A neutralized graft copolymer solution was prepared. About 40 parts by weight of 2-amino-2-methyl-1-propanol was added to about 485 parts by weight of the above graft copolymer solution over about 20 minutes with stirring at room temperature and stirring was continues for about 30 minutes.

A waterborne black pigment dispersion was prepared by charging the following constituents into a 01 Attritor media mill:

|  | Parts by Weight |
|---|---|
| Neutralized graft copolymer solution (prepared above) | 46.66 |
| Deionized water | 257.84 |
| Carbon black pigment (Raven 1170 powder from Columbian) | 45.50 |
| Hi-density ceramic 1.6–2.5 mm grinding media (ER120A from Netsch) | 850.00 |
| Total | 1200.00 |

The above constituents were ground for 20 hours at 500 rpm. A uniform, waterborne pigment dispersion was formed that was stable and deflocculated and had a pH of 8.2.

A waterborne blue pigment dispersion was prepared by charging the following constituents into a 01 Attritor media mill:

|  | Parts by Weight |
|---|---|
| Neutralized graft copolymer solution (prepared above) | 53.16 |
| Deionized water | 261.84 |
| Blue pigment (Palomar blue pigment EB-8592 from Mobay) | 35.00 |
| Hi-density ceramic 1.6–2.5 mm grinding media (ER120A from Netsch) | 850.00 |
| Total | 1200.00 |

The above constituents were ground for 24 hours at 500 rpm. A uniform, waterborne pigment dispersion was formed that was stable and deflocculated and had a pH of 8.5.

A waterbone blue pigment II dispersion was prepared by charging the following constituents into a 01 Attritor media mill:

|  | Parts by Weight |
|---|---|
| Neutralized graft copolymer solution (prepared above) | 53.16 |
| Deionized water | 261.84 |
| Blue pigment (BT-788-D blue pigment from Cookson) | 35.00 |
| Hi-density ceramic 1.6–2.5 mm grinding media (ER120A from Netsch) | 850.00 |
| Total | 1200.00 |

The above constituents were ground for 24 hours at 500 rpm. A uniform, waterborne pigment dispersion was formed that was stable and deflocculated and had a pH of 8.4.

EXAMPLE 4

The following constituents were charged into a one liter flask equipped as in Example 1 to form a graft copolymer solution:

|  | Parts by Weight |
|---|---|
| Portion 1 | |
| Macromonomer (prepared in Example 1) | 84.8 |
| Ethyl acrylate monomer | 12.9 |
| Isopropanol | 170.0 |
| Portion 2 | |
| 2,2'-azobis(2-methylbutanenitrile) | 3.0 |
| Isopropanol | 30.0 |
| Portion 3 | |
| Ethyl acrylate monomer | 202.5 |
| Portion 4 | |
| 2,2'-azobis(2,4-dimethylpentanenitrile) | 1.0 |
| Isopropanol | 90.0 |
| Total | 594.2 |

Portion 1 was heated to its reflux temperature over a period of about 20 minutes. Portion 2 was added and simultaneously Portions 3 and 4 were gradually added over about a 3 hour period while maintaining the resulting reaction mixture at its reflux temperature. The reaction mixture was held at its reflux temperature for about an additional 2 hours and then cooled to room temperature.

The resulting graft polymer solution had a solids content of about 51% by weight and the graft copolymer had the following overall approximate composition 72% ethyl acrylate, 11% methacrylic acid, and 17% methyl methacrylate and had a weight average molecular weight of about 12,000 and a number average molecular weight of about 4,900.

A neutralized graft copolymer solution was prepared. About 18.4 parts by weight of 2-amino-2-methyl-1-propanol in 100.0 parts by weight of isopropanol was added to about 300 parts by weight of the above graft copolymer solution over about 20 minutes with stirring at room temperature and stirring was continues for about 30 minutes.

A waterborne magenta pigment dispersion was prepared by charging the following constituents into a 01 Attritor media mill:

|  | Parts by Weight |
|---|---|
| Neutralized graft copolymer solution (prepared above) | 47.81 |
| Deionized water | 302.19 |
| Quinacridone magenta pigment (Hostaperm Pink E Trans 01 13-7014 from Hoechst Celanese) | 17.50 |
| Hi-density ceramic 1.6–2.5 mm grinding media (ER120A from Netsch) | 850.00 |
| Total | 1217.50 |

The above constituents were ground for 20 hours at 500 rpm. A uniform, transparent, waterborne pigment dispersion was formed that was stable and deflocculated and had a pH of 8.5.

EXAMPLE 5

The following constituents were charged into a one liter flask equipped as in Example 1 to form a graft copolymer solution:

|  | Parts by Weight |
|---|---|
| Portion 1 | |
| Macromonomer (prepared in Example 1) | 85.0 |
| Ethyl acrylate monomer | 84.0 |
| Acrylic acid monomer | 6.0 |
| Deionized water | 40.0 |
| Isopropanol | 90.0 |
| Portion 2 | |
| T-butyl perxoy pivalate (75% solids in mineral spirits) | 2.0 |
| Isopropanol | 20.0 |
| Portion 3 | |
| Acrylic acid monomer | 24.0 |
| Ethyl acrylate monomer | 366.0 |
| Isopropanol | 60.0 |
| Portion 4 | |
| T-butyl perxoy pivalate (75% solids in mineral spirits) | 4.0 |
| Isopropanol | 180.0 |
| Total | 961.0 |

Portion 1 was heated to its reflux temperature over a period of about 20 minutes. Portions 2 was added and simultaneously Portions 3 and 4 were gradually added over about a 3 hour period while maintaining the resulting reaction mixture at its reflux temperature. The reaction mixture was held at its reflux temperature for about an additional hour and then cooled to room temperature.

The resulting graft polymer solution had a solids content of about 56% by weight and the graft copolymer had the following overall approximate composition 80% ethyl acrylate, 6% methacrylic acid, 9% methyl methacrylate and 5% acrylic acid and had a weight average molecular weight of about 24,000 and a number average molecular weight of about 5,300.

A neutralized graft copolymer solution was prepared. About 15.2 parts by weight of 2-amino-2-methyl-1-propanol in 100.0 parts by weight of isopropanol was added to about 200 parts by weight of the above graft copolymer solution over about 20 minutes with stirring at room temperature and stirring was continues for about 30 minutes.

A waterborne transparent iron oxide pigment dispersion was prepared by charging the following constituents into a 01 Attritor media mill:

|  | Parts by Weight |
|---|---|
| Neutralized graft copolymer solution (prepared above) | 63.60 |
| Deionized water | 240.90 |
| Transparent iron oxide pigment (Sicotrans Red L 2817 from BASF) | 45.50 |
| Hi-density ceramic 1.6–2.5 mm grinding media (ER120A from Netsch) | 850.00 |
| Total | 1200.00 |

The above constituents were ground for 20 hours at 500 rpm. A uniform, transparent, waterborne pigment dispersion was formed that was stable and deflocculated and had a pH of 8.2.

EXAMPLE 6

The following constituents were charged into a five liter flask equipped as in Example 1 to form a graft copolymer solution:

|  | Parts by Weight |
|---|---|
| Portion 1 | |
| Macromonomer (prepared in Example 1) | 255.0 |
| Ethyl acrylate monomer | 126.0 |
| Methyl acrylate monomer | 126.0 |
| Acrylic acid monomer | 18.0 |
| Isopropanol | 1450.0 |
| Portion 2 | |
| 2,2'-azobis(2,4'dimethylpentanenitrile) | 4.5 |
| Isopropanol | 60.0 |
| Portion 3 | |
| Acrylic acid monomer | 72.0 |
| Butyl acrylate monomer | 549.0 |
| Methyl acrylate monomer | 549.0 |
| Portion 4 | |
| 2,2'-azobis(2,4-dimethylpentanenitrile) | 15.0 |
| Isopropanol | 150.0 |
| Portion 5 | |
| 2,2'-azobis(2,4-dimethylpentanenitrile) | 1.0 |
| Isopropanol | 10.0 |
| Total | 3385.5 |

Portion 1 was heated to its reflux temperature over a period of about 20 minutes. Portion 2 was added and simultaneously Portions 3 and 4 were gradually added over about a 3 hour period while maintaining the resulting reaction mixture at its reflux temperature. The reaction mixture was held at its reflux temperature for about an additional 2 hours and Portion 5 was added over a 5 minute period and reflux was continue for about 15 minutes then the resulting polymer solution was cooled to room temperature.

The resulting graft polymer solution had a solids content of about 50% by weight and the graft copolymer had the following overall approximate composition 40% butyl acrylate, 40% methyl acrylate, 6% methacrylic acid, 9% methyl methacrylate and 5% acrylic acid and had a weight average molecular weight of about 10,000 and a number average molecular weight of about 3,200.

A neutralized graft copolymer solution was prepared. About 130.0 parts by weight of 2-amino-2-methyl-1-propanol was added to about 2000 parts by weight of the above graft copolymer solution over about 20 minutes with stirring at room temperature and stirring was continues for about 30 minutes.

A waterborne white pigment dispersion was prepared by charging the following constituents into a 1-S Attritor media mill:

|  | Parts by Weight |
|---|---|
| Neutralized graft copolymer solution (prepared above) | 712.80 |
| Deionized water | 1813.20 |
| Titanium dioxide pigment | 3462.00 |
| 2-amino-2-methyl-1-propanol | 6.00 |
| Hi-density ceramic 1.6–2.5 mm grinding media (ER120A from Netsch) | 5600.00 |
| Total | 11594.00 |

The above constituents were ground for 3 hours at 500 rpm. A uniform, opaque, waterborne pigment dispersion was formed that was stable and loosely flocculated and had a pH of 8.6.

EXAMPLE 7

A white paint was prepared with the white pigment dispersion of Example 6 and was tinted with the black pigment dispersion of Example 2. The following constituents were blended together to form the white paint:

|  | Parts by Weight |
|---|---|
| Latex 1 (core shell microgel acrylic latex having a low acid functionality) | 330.00 |
| Latex 2 (core shell microgel acrylic latex having a high acid functionality) | 330.00 |
| Deionized water | 70.00 |
| Ethylene glycol monobutyl ether | 100.00 |
| Crosslinking agent (monomeric hexa methyoxy methyl melamine formaldehyde) | 54.00 |
| Deionized Water | 140.00 |
| White pigment dispersion (prepared in Example 6) | 280.00 |
| UV Screener ("Tinuvin" 1139 in water ethylene glycol monobutyl ether and anionic surfactant) | 6.00 |
| Acrysol ASE-60 Thickener (aqueous dispersion of 3.35% by weight of crosslinked acrylic emulsion polymer) | 164.09 |
| Demineralized water | 97.50 |
| Acrylsol ASE-60 Thickener | 188.49 |
| 2-methyl-2-amino-1-propanol | 3.50 |
| Total | 1763.48 |

The resulting basecoat had a pH of 7.4 and a Brookfield viscosity at 5 rpm using a #3 spindle of 2100 cps and 9.46% pigment (titanium dioxide).

The following amount of black waterborne dispersion of Example 2 was added to the white basecoat and evaluated for tinting strength.

|  | Parts by Weight |
|---|---|
| White basecoat (prepared above) | 99.27 |
| Black pigment dispersion (prepared in Ex. 2) | 0.73 |
| Total | 100.00 |

The resulting composition had a tint strength of black/white of 1/100 and had an L Flat of 60.71 which is comparable or better than conventional commercial black pigment dispersions that are used to form coatings.

We claim:

1. A pigment dispersion comprising dispersed pigment, an aqueous carrier and a graft copolymer dispersant; wherein the graft copolymer comprises about 90–50% by weight, of a polymeric backbone and correspondingly about 10–50% by weight, of macromonomer side chains attached to the backbone and has a weight average molecular weight of about 5,000–100,000 and wherein (1) the polymeric backbone is hydrophobic in comparison to the side chains and consists essentially of polymerized ethylenically unsaturated hydrophobic monomers and up to 20% by weight, based on the weight of the graft copolymer, of polymerized ethylenically unsaturated acid containing monomers; and (2) the side chains are hydrophilic macromonomers attached to the backbone at a single terminal point and consists essentially of polymerized ethylenically unsaturated monomers polymerized in the presence of a cobalt chain transfer agent and contains 20–50% by weight, based on the weight of the macromonomer, of polymerized ethylenically unsaturated acid containing monomers and have a weight average molecular weight of about 1,000–30,000 and wherein the acid groups of the graft copolymer are neutralized with an inorganic base or an amine.

2. The pigment dispersion of claim 1 in which the macromonomer is formed by polymerizing the monomers in the presence of a catalytic chain transfer agent containing $Co^{+2}$.

3. The pigment dispersion of claim 2 in which the macromonomer consists essentially of polymerized alkyl methacrylate monomers or any mixtures thereof each having 1–8 carbon atoms in the alkyl groups and 20–50% by weight, based on the weight of the macromonomer of polymerized ethylenically unsaturated carboxylic acid and has a weight average molecular weight of about 2,000–5,000.

4. The pigment dispersion of claim 3 in which the macromonomer consists of 50–80% by weight of polymerized methyl methacrylate and 20–50% by weight of polymerized methacrylic acid.

5. The pigment dispersion of claim 2 in which the macromonomer consist essentially of polymerized alkyl methacrylate, having 1–8 carbon atoms in the alkyl groups and polymerized ethylenically unsaturated sulfonic acid and has a weight average molecular weight of about 2,000–5,000.

6. The pigment dispersion of claim 2 in which the backbone of the graft copolymer consist essentially of polymerized monomers of alkyl methacrylate, an alkyl acrylate or mixtures thereof where the alkyl groups have 1-8 carbon atoms and 1-10% by weight, based on the weight of the graft copolymer of polymerized ethylenically unsaturated carboxylic acid or ethylenically unsaturated sulfonic acid.

7. The pigment dispersion of claim 2 in which the backbone of the graft copolymer consist essentially of polymerized monomers of alkyl methacrylate, an alkyl acrylate or mixtures thereof where the alkyl groups have 1-8 carbon atoms and 1-10% by weight, based on the weight of the graft copolymer of polymerized methacrylic acid or acrylic acid.

8. The pigment dispersion of claim 3 in which the macromonomer consists of 50-80% by weight of polymerized methyl methacrylate and 20-50% by weight of polymerized methacrylic acid and has a weight average molecular weight of about 2,000-5,000 and the backbone of the graft copolymer consists of polymerized methyl acrylate and butyl acrylate and the graft copolymer is neutralized with amino methyl propanol.

9. The pigment dispersion of claim 3 in which the macromonomer consists of 50-80% by weight of polymerized methyl methacrylate and 20-50% by weight of polymerized methacrylic acid and has a weight average molecular weight of about 2,000-5,000 and the backbone of the graft copolymer consists of polymerized methyl acrylate and butyl acrylate and acrylamido methyl propane sulfonic acid and the graft copolymer is neutralized with amino methyl propanol.

10. A graft copolymer comprising about 90-50% by weight, of a polymeric backbone and correspondingly about 10-50% by weight, of macromonomer side chains attached to the backbone and has a weight average molecular weight of about 5,000-100,00 and wherein
    (1) the polymeric backbone is hydrophobic in comparison to the side chains and consists essentially of polymerized ethylenically unsaturated hydrophobic monomers and up to 20% by weight, based on the weight of the graft copolymer, of polymerized ethylenically unsaturated acid containing monomers; and
    (2) the side chains are hydrophilic macromonomers attached to the backbone at a single terminal point and consists essentially of polymerized ethylenically unsaturated monomers and 20-50% by weight, based on the weight of the macromonomer, of polymerized ethylenically unsaturated acid and are polymerized by using a catalytic chain transfer agent containing $Co^{+2}$ and the macromonomers have a weight average molecular weight of about 1,000-30,000.

11. The graft copolymer of claim 10 in which the macromonomer consists essentially of polymerized alkyl methacrylate monomers or any mixtures thereof each having 1-8 carbon atoms in the alkyl groups and 20-50% by weight, based on the weight of the macromonomer, of polymerized ethylenically unsaturated carboxylic acid and has a weight average molecular weight of about 2,000-5,000.

12. The graft copolymer of claim 10 in which the macromonomer consists of 50-80% by weight of polymerized methyl methacrylate and 20-50% by weight of polymerized methacrylic acid.

13. The graft copolymer of claim 11 in which the macromonomer consist essentially of polymerized alkyl methacrylate, having 1-8 carbon atoms in the alkyl group and polymerized ethylenically unsaturated sulfonic acid and has an weight average molecular weight of about 2,000-5,000.

14. The graft copolymer of claim 11 in which the backbone of the graft copolymer consist essentially of polymerized monomers of alkyl methacrylate, an alkyl acrylate or mixtures thereof where the alkyl groups have 1-8 carbon atoms and 1-10% by weight, based on the weight of the graft copolymer of methacrylic acid or acrylic acid.

15. The graft copolymer claim 11 in which the backbone of the graft copolymer consist essentially of polymerized monomers of alkyl methacrylate, an alkyl acrylate or mixtures thereof where the alkyl groups have 1-8 carbon atoms and 1-10% by weight, based on the weight of the graft copolymer of ethylenically unsaturated sulfonic acid.

16. The graft copolymer of claim 11 in which the macromonomer consists of 50-80% by weight of polymerized methyl methacrylate and 20-50% by weight of polymerized methacrylic acid and has a weight average molecular weight of about 2,000-5,000 and the backbone of the graft copolymer consists of polymerized methyl acrylate and butyl acrylate.

17. The graft copolymer of claim 11 in which the macromonomer consists of 50-80% by weight of polymerized methyl methacrylate and 20-50% by weight of polymerized methacrylic acid and has a weight average molecular weight of about 2,000-5,000 and the backbone of the graft copolymer consists of polymerized methyl acrylate and butyl acrylate and acrylamido methyl propane sulfonic acid.

18. A process for forming a pigment dispersion of comprising pigment, an aqueous carrier and a polymeric dispersant which consists essentially of a graft copolymer having a weight average molecular weight of about 5,000-100,000 and comprises about 90-50% by weight, of a polymeric backbone having about 10-50% by weight, of macromonomer side chains attached thereto, where the backbone is hydrophobic relative to the hydrophilic side chains; the process comprising
    (a) preparing macromonomer, in an organic solvent, by polymerizing, using a catalytic chain transfer agent containing $Co^{+2}$, ethylenically unsaturated monomers and 20-50% by weight, based on weight of the resulting macromonomer, of ethylenically unsaturated acid monomers to form a macromonomer containing acid groups and a terminal ethylenically unsaturated group,
    (b) forming, in an organic solvent, the graft copolymer by polymerizing, in the presence of said macromonomers prepared in step (a) ethylenically unsaturated hydrophobic monomers and up to 20% by weight, based on the weight of the graft copolymer, of ethylenically unsaturated acid monomers whereby said terminal group of the macromonomer is polymerized into the backbone to form the graft copolymer and neutralizing the acid groups of the copolymer with an inorganic base or an amine,
    (c) mixing the graft copolymer solution prepared in step (b) with an aqueous medium and pigment and dispersing the pigment therein to form a pigment dispersion.

* * * * *